United States Patent
Christ, Jr. et al.

(10) Patent No.: US 7,154,613 B2
(45) Date of Patent: Dec. 26, 2006

(54) COLOR CODED LIGHT FOR AUTOMATED SHAPE MEASUREMENT USING PHOTOGRAMMETRY

(75) Inventors: Robert J. Christ, Jr., Brentwood, NY (US); John M. Papazian, Great Neck, NY (US)

(73) Assignee: Northrop Grumman Corporation, Los Angeles, CA (US)

( * ) Notice: Subject to any disclaimer, the term of this patent is extended or adjusted under 35 U.S.C. 154(b) by 376 days.

(21) Appl. No.: 10/800,499

(22) Filed: Mar. 15, 2004

(65) Prior Publication Data

US 2005/0200857 A1    Sep. 15, 2005

(51) Int. Cl.
*G01J 1/42*    (2006.01)
(52) U.S. Cl. .................. 356/601; 356/603; 356/606; 356/614; 356/622
(58) Field of Classification Search ........... 356/610, 356/601–603, 623, 606–608, 614, 622, 609; 345/426, 427; 250/559.22
See application file for complete search history.

(56) References Cited

U.S. PATENT DOCUMENTS

| 4,175,862 | A | 11/1979 | DiMatteo et al. |
| 4,508,452 | A | 4/1985 | DiMatteo et al. |
| 4,511,252 | A * | 4/1985 | Di Matteo et al. .......... 356/610 |
| 4,802,759 | A | 2/1989 | Matsumoto et al. |
| 4,986,652 | A | 1/1991 | Mogilevsky et al. |
| 5,307,151 | A | 4/1994 | Hof et al. |
| 5,608,529 | A | 3/1997 | Hori |
| 5,675,407 | A | 10/1997 | Geng |
| 6,252,623 | B1 | 6/2001 | Lu et al. |
| 6,341,016 | B1 | 1/2002 | Malione |
| 6,700,669 | B1 * | 3/2004 | Geng .......................... 356/603 |
| 2002/0149691 | A1 | 10/2002 | Pereira et al. |

FOREIGN PATENT DOCUMENTS

WO    WO 01/81859 A1    11/2001

* cited by examiner

*Primary Examiner*—Gregory J. Toatley, Jr.
*Assistant Examiner*—Tri Ton
(74) *Attorney, Agent, or Firm*—Alan G. Towner, Esq.; Pietragallo, Bosick & Gordon LLP

(57) ABSTRACT

A method and apparatus for using a plurality of regions of colored light to index and locate discrete targets in photogrammetry systems. The colored regions of light are used to determine a unique location on the surface of a three-dimensional object. Multiple projections of colored regions may be used to determine precise locations on the surface of the object. Each colored region may be assigned a color-numeric identified to assist in the indexing process. The process is suitable for determining the shape of aircraft, watercraft and automotive parts.

62 Claims, 11 Drawing Sheets

FIG. 13

|        | 0      | 1      | 2      | 3      | 4      | ... | 62       | 63       |
|--------|--------|--------|--------|--------|--------|-----|----------|----------|
| 0      | (0,0)  | (1,0)  | (2,0)  | (3,0)  | (4,0)  | ... | (62,0)   | (63,0)   |
| 1      | (0,1)  | (1,1)  | (2,1)  | (3,1)  | (4,1)  | ... | (62,1)   | (63,1)   |
| 2      | (0,2)  | (1,2)  | (2,2)  | (3,2)  | (4,2)  | ... | (62,2)   | (63,2)   |
| 3      | (0,3)  | (1,3)  | (2,3)  | (3,3)  | (4,3)  | ... | (62,3)   | (63,3)   |
| 4      | (0,4)  | (1,4)  | (2,4)  | (3,4)  | (4,4)  | ... | (62,4)   | (63,4)   |
| ⋮      | ⋮      | ⋮      | ⋮      | ⋮      | ⋮      |     | ⋮        | ⋮        |
| 62     | (0,62) | (1,62) | (2,62) | (3,62) | (4,62) | ... | (62,62)  | (63,62)  |
| 63     | (0,63) | (1,63) | (2,63) | (3,63) | (4,63) | ... | (62,63)  | (63,63)  |

FIG. 14

|         | R   | G   | B   |
|---------|-----|-----|-----|
| BLACK   | 0   | 0   | 0   |
| GREEN   | 0   | 255 | 0   |
| RED     | 255 | 0   | 0   |
| YELLOW  | 255 | 255 | 0   |
| BLUE    | 0   | 0   | 255 |
| CYAN    | 0   | 255 | 255 |
| MAGENTA | 255 | 0   | 255 |
| WHITE   | 255 | 255 | 255 |

COLOR CODED LIGHT FOR AUTOMATED SHAPE MEASUREMENT USING PHOTOGRAMMETRY

FIELD OF THE INVENTION

This invention relates to a method and apparatus for three-dimensional surface measurement, and more particularly to a method of using regions of colored light to index and locate discrete targets in photogrammetry systems.

BACKGROUND INFORMATION

Photogrammetry is a non-contact method of shape measurement that involves taking multiple two-dimensional images of a three-dimensional object from a plurality of different angles, and triangulating the two-dimensional images to produce a three-dimensional surface model of the object. When manufactured parts require assembly, the precise shape and size of the parts is required. This is especially true of delicate, complex, large and expensive aircraft, watercraft and/or automotive components where the accuracy of part shape is determined prior to attempted assembly. Photogrammetry is useful for testing, modeling, reproducing and measuring surface variations of an object. Parts that are tested with photogrammetric processes often require fewer jigs and other fixtures during assembly, thereby reducing production costs and assembly time.

Two-dimensional images used in photogrammetry contain a series of targets that represent co-ordinate areas on a three-dimensional object. Each target represents a precise location on a three-dimensional surface and can be used to identify common locations among multiple two-dimensional images. Targets are either manually applied or projected onto the three-dimensional object. One of the most commonly used methods of applying targets to an object is to project dots of white light onto the surface of an object. Typically, a software package is used that will outline the three-dimensional object and record the projected targets. Every target in every image must be identified and cross-referenced with other targets representing the same area in other images. Photogrammetric processes require that each target appear in at least two two-dimensional images for cross-referencing purposes. Once the targets are cross-referenced, the software orients each image by aligning identical targets in multiple images. This process of triangulation allows a plurality of two-dimensional images to model a three-dimensional object.

One of the constraints of photogrammetry is that the coordinates of an object are determined only at the target locations. To obtain as accurate a surface contour as possible, it is desirable to project a dense array of targets onto the surface of the object. When an object surface has steep contours, a particularly dense array of targets must be used to capture the change in surface elevation. One of the significant problems associated with traditional methods of photogrammetry is that a crowded array of targets can lead to ambiguity in the identification of the individual targets within the plurality of two-dimensional images. The denser the target arrangement becomes, the more difficult it is for a software program to identify a particular target in a plurality of images. In these circumstances, an operator must manually identify "reference" targets in each of the images to assist the software in identifying the remaining targets. This is a time consuming process, and often requires multiple attempts before the target pattern is successfully identified and indexed. Accordingly, a need remains for an improved method and apparatus for identifying specific targets within a target array for photogrammetric processes.

The present invention has been developed in view of the foregoing.

SUMMARY OF THE INVENTION

The present invention provides an improved method of determining the shape of an object by projecting a pattern of targets and a sequence of differently oriented regions of colored light onto the surface of an object, capturing an image of each projection and assigning a unique color-numeric identifier to each colored region and correlating each color-numeric identifier with each target projected onto the surface of an object to precisely identify locations on the surface of the object. The identified targets are then triangulated to produce an accurate model of the surface characteristics of the object.

An aspect of the present invention is to provide a method for determining the shape of a three-dimensional object comprising: illuminating at least a portion of a surface of the object with electromagnetic radiation comprising a plurality of first bands of differentiated characteristics to form a first bands projection; detecting the first bands projection including the first bands of differentiated characteristics; illuminating at least a portion of the surface of the object with electromagnetic radiation comprising a plurality of second bands of differentiated characteristics to form a second bands projection, the second bands having a different orientation than the first bands; detecting the second bands projection including the second bands of differentiated characteristics; and determining the shape of the object from the detected first bands projection and the detected second bands projection.

Another aspect of the present invention is to provide a method for determining the shape of a three-dimensional object comprising: illuminating at least a portion of a surface of the object with electromagnetic radiation comprising a plurality of wide bands of differentiated characteristics to form a wide bands projection; detecting the wide bands projection including the wide bands of differentiated characteristics; illuminating the same portion of the surface of the object with electromagnetic radiation comprising a plurality of thin bands of differentiated characteristics to form a thin bands projection, wherein the thin bands have an orientation that is substantially the same as the orientation of the wide bands, and at least one of the thin bands has a width that is less than the width of at least one of the wide bands; detecting the thin bands projection including the thin bands of differentiated characteristics; and determining the shape of the object from the detected wide bands projection and the detected thin bands projection.

Another aspect of the present invention is to provide a method for determining the shape of a three-dimensional object comprising: illuminating at least a portion of a surface of the object with electromagnetic radiation comprising a plurality of bands of differentiated characteristics, wherein each band has a substantially uniform appearance to form a projection; detecting the projection including the bands of differentiated characteristics; and determining the shape of the object from the detected projection.

Another aspect of the present invention is to provide an apparatus for determining the shape of a three-dimensional object comprising: illuminating means for illuminating at least a portion of a surface of the object with electromagnetic radiation comprising a plurality of first bands of differentiated characteristics to form a first bands projection; detecting means for detecting the first bands projection including the first bands of differentiated characteristics; second illuminating means for illuminating at least a portion of the surface of the object with electromagnetic radiation comprising a plurality of second bands of differentiated characteristics to form a second bands projection, the second bands having a different orientation than the first bands; second detecting means for detecting the second bands projection including the second bands of differentiated characteristics; and shape determining means for determining the shape of the object from the detected first bands projection and the detected second bands projection.

Yet another aspect of the present invention is to provide an apparatus for determining the shape of a three-dimensional object comprising: illuminating means for illuminating at least a portion of a surface of the object with electromagnetic radiation comprising a plurality of wide bands of differentiated characteristics to form a wide bands projection; detecting means for detecting the wide bands projection including the wide bands of differentiated characteristics; second illuminating means for illuminating the same portion of the surface of the object with electromagnetic radiation comprising a plurality of thin bands of differentiated characteristics to form a thin bands projection, wherein the thin bands have an orientation that is substantially the same as the orientation of the wide bands, and at least one of the thin bands has a width that is less than the width of at least one of the wide bands; second detecting means for detecting the thin bands projection including the thin bands of differentiated characteristics; and shape determining means for determining the shape of the object from the detected wide bands projection and the detected thin bands projection.

Yet another aspect of the present invention is to provide an apparatus for determining the shape of a three-dimensional object comprising: illuminating means for illuminating at least a portion of a surface of the object with electromagnetic radiation comprising a plurality of bands of differentiated characteristics, wherein each band has a substantially uniform appearance to form a projection; detecting means detecting the projection including the bands of differentiated characteristics; and shape determining means for determining the shape of the object from the projection.

These and other aspects of the present invention will be more apparent from the following description.

BRIEF DESCRIPTION OF THE DRAWINGS

FIG. 13 is a schematic illustration of the overall final region values produced as a composite function of horizontal final region values and the vertical final region values.

FIG. 14 is a chart showing the RGB color values in accordance with an embodiment of the present invention.

DETAILED DESCRIPTION

Figure 1:
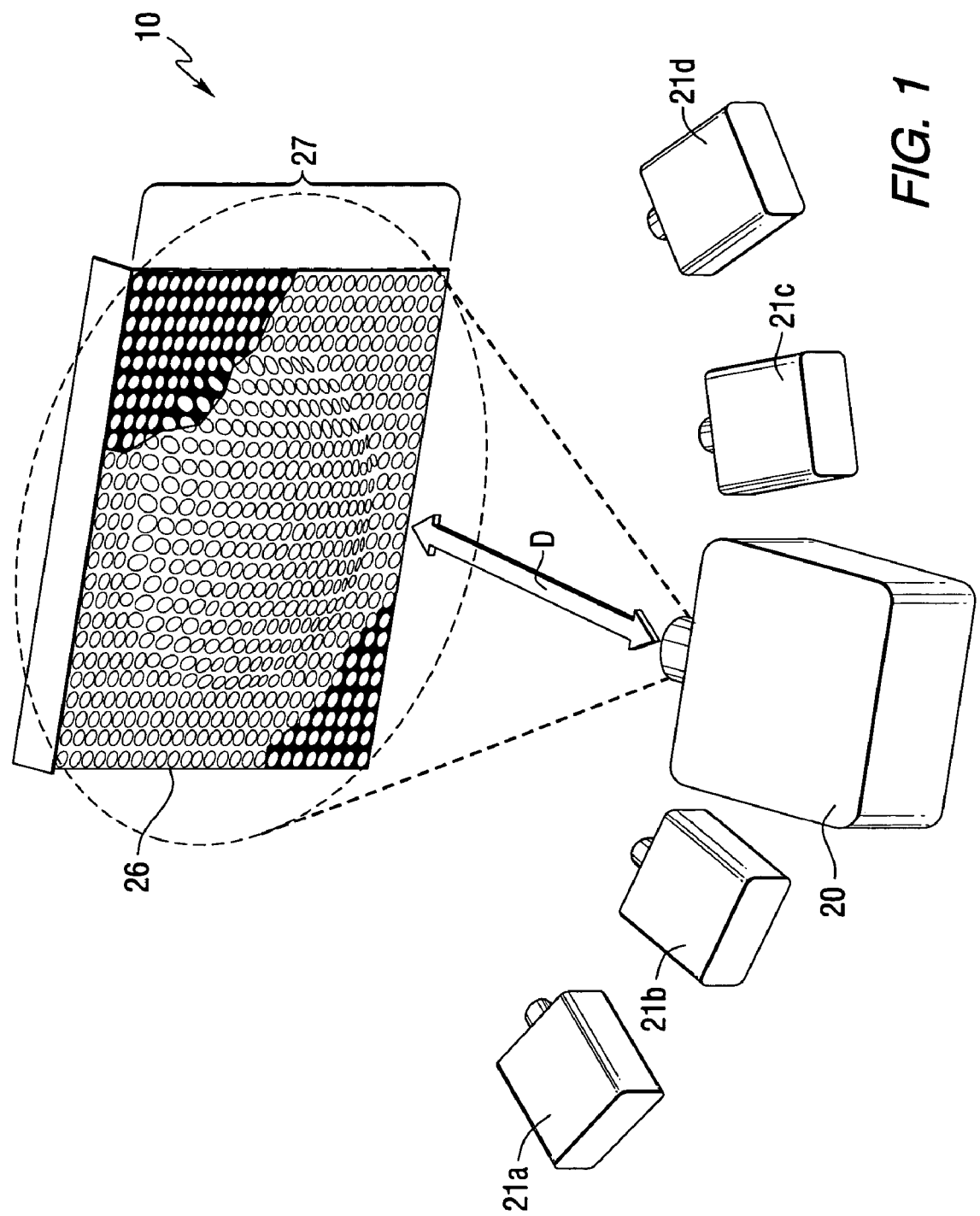
FIG. 1 is a schematic illustration of a photogrammetric three-dimensional imaging system utilizing a source of illumination to project a plurality of discrete targets of electromagnetic radiation onto the surface of an object and a plurality of image capture devices to detect the plurality of targets from various angles in accordance with an embodiment of the present invention.
Figure 2:
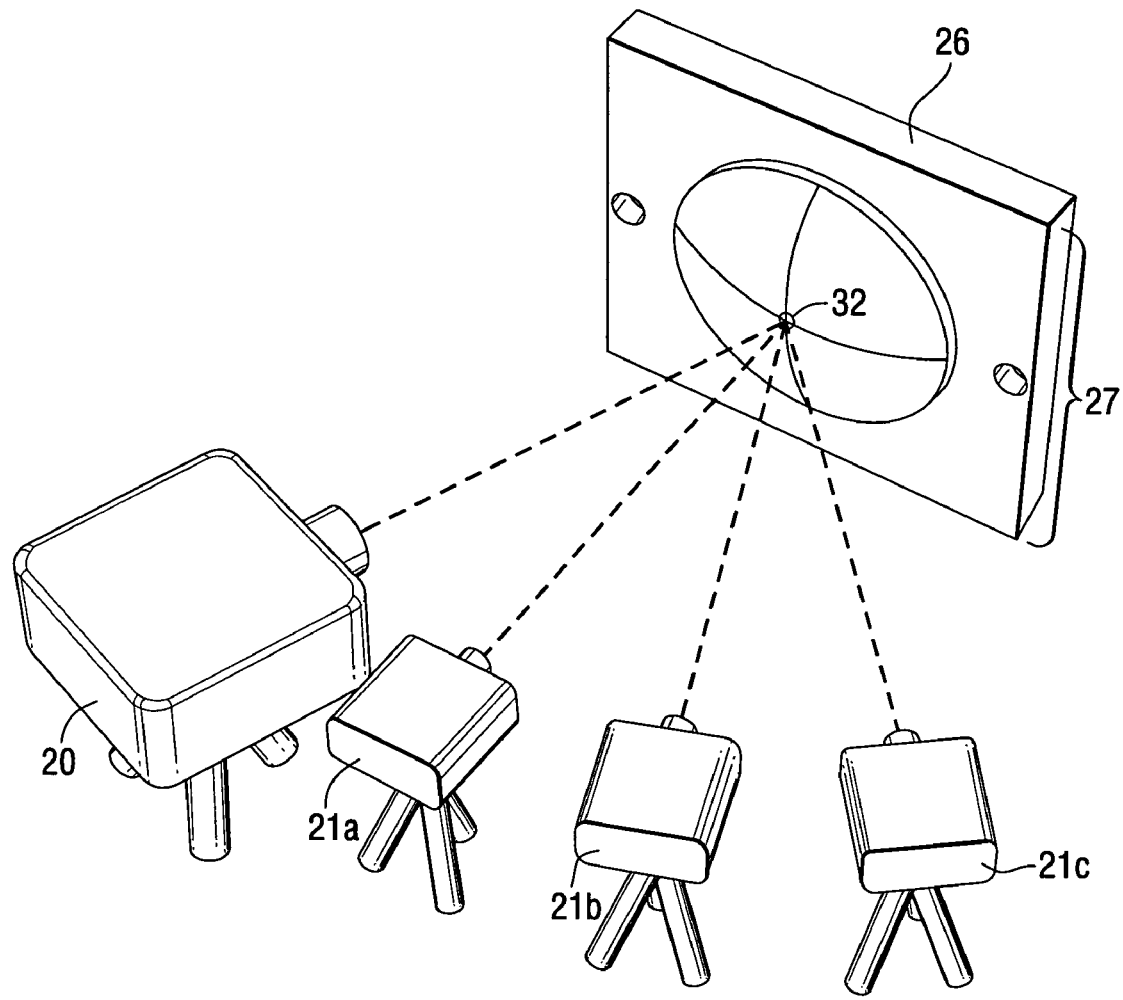
FIG. 2 is a schematic illustration of a photogrammetric three-dimensional imaging system utilizing a source of illumination to project a single target of electromagnetic radiation onto the surface of an object and a plurality of image capture devices to detect the single target from various angles in accordance with an embodiment of the present invention.

FIGS. 1 and 2 schematically illustrate a photogrammetry system 10, in accordance with an embodiment of the present invention. The system 10 includes a three-dimensional object 26 having a surface 27 to be modeled or determined, a source of illumination 20 and a series of image capture devices, e.g., cameras, 21a, 21b, 21c and 21d. The object 26 may be of any size and shape, including large irregular objects having a generally smooth surface 27.

The source of illumination 20 is capable of projecting any suitable type of electromagnetic radiation onto a surface 27 of the object 26. The source of illumination 20 can comprise a single projector or a plurality of projectors. Any desired wavelength(s) of electromagnetic radiation may be projected. In one embodiment, the source of illumination 20 is a projector capable of projecting electromagnetic radiation in the visible spectrum. The source of illumination 20 may project white light and/or individual regions of colored light within the visible spectrum. In another embodiment, the source of illumination 20 projects infrared radiation, such as near-infrared, mid-infrared and/or far-infrared radiation. In another embodiment, the source of illumination 20 is a projector capable of projecting electromagnetic radiation in the ultraviolet spectrum. In yet another embodiment, the source of illumination is capable of projecting electromagnetic radiation having varying hue, saturation and/or perceived brightness. As used herein the term "hue" means the color of light defined by wavelength or mixture of wavelengths. In some instances, there is no single wavelength of light that has a particular hue, rather a combination of wavelengths is required. For example, there is no single wavelength of light that has a magenta hue, rather it is produced from equal parts red electromagnetic radiation and blue electromagnetic radiation. As used herein the term "saturation" means colored electromagnetic radiation having a percentage mixture of white light. A fully saturated color has no mixture of white light. For example, pink may be thought of as having the same hue as red but being less saturated due to a higher mixture of white light. As used herein the term "perceived brightness" is a function of power per unit area on the illuminated surface and degree of reflectivity. In some embodiments surfaces with differing characteristics, but emitting the same number of lumens, will be perceived to be equally bright.

In accordance with the present invention, the source of illumination 20 projects a series of projections onto the surface 27 of the object 26. It is herein understood that the order of the projections is not limiting of the invention, and that any projection may be projected in any order. As used herein the terms "first projection", "second projection", "third projection", "fourth projection" and "fifth projection" are used only for convenience of explanation and are not to be construed as limiting the present invention. In one embodiment, each projection occupies the same surface area of the object 26.

A plurality of image capture devices 21a–d detect each projection. As shown in FIGS. 1 and 2, the image capture devices 21a–d may be located at a plurality of discrete locations, each capable of detecting electromagnetic radiation projected from the source of illumination 20 and reflected from the surface 27 of the object 26. In this embodiment, for any given projection, at least two of the image capture devices 21a–d detect and/or record at least one identical area of the same projection. Each image capture device 21 remains stationary throughout the first, second, third, fourth and fifth projections. Any number of image capture devices 21 can be used in this embodiment.

In another embodiment of the present invention, image capture devices 21a–d can be coupled to a computer program device that is capable of recording the electromagnetic radiation reflected from the surface of object 26. In addition to the multiple image capture device arrangement shown in FIGS. 1 and 2, a single image capture device 21 may alternatively be used. In this embodiment, the single image capture device 21 remains in a fixed location throughout each of the first, second, third, fourth and fifth projections. The single image capture device 21 is then moved to another location and remains in the new fixed location throughout the duration of a second set of first, second, third, fourth and fifth projections. Thus, multiple angles may be captured sequentially from the same camera. In another embodiment, the image capture devices 21 can remain in a fixed location and the object 26 can be moved, such as in an assembly line. Image capture device(s) 21 can comprise digital cameras, analog cameras, CCD cameras or the like.

As shown in FIG. 1, source of illumination 20 is positioned at a distance D from the object 26. Distance D may be any length suitable to allow the source of illumination 20 to project electromagnetic radiation onto a surface of object 27 and to allow the image capture devices 21 to detect the electromagnetic radiation reflected from the surface of object 27. In one embodiment, distance D is from about 3 to about 30 feet. The image capture devices 21a–d may be positioned at any suitable locations. In one embodiment, the spacing between the image capture devices 21a–d may be substantially uniform. A typical distance range between the image capture devices 21a–d and the object 26 may range from about 6 inches to about 50 feet.

Once the image capture devices 21a–d detect data correlating to the current projection of electromagnetic radiation, the image capture devices 21 may transmit a record of the projection to a computer program capable of storing the information.

Once the image capture devices 21 detect and/or record any of the first, second, third, fourth or fifth projections of electromagnetic radiation, the projector 20 ceases projecting the current projection then projects the next successive projection. In one embodiment, the process of projecting the first projection, detecting the first projection, ceasing to project the first projection, projecting the second projection, detecting the second projection, ceasing to project the second projection, etc. is automated.

Figure 3:
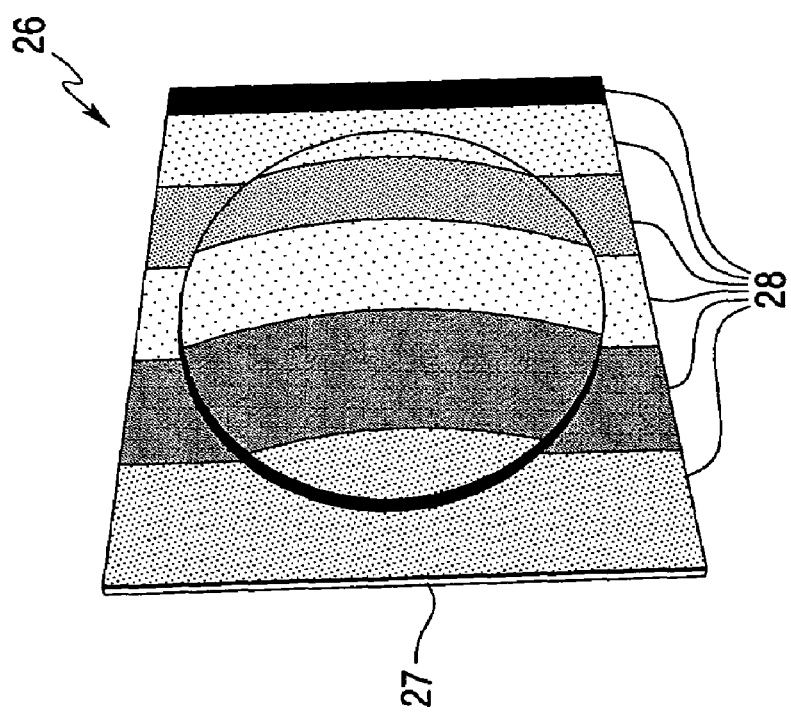
FIG. 3 is a schematic illustration of a plurality of wide vertical bands projected onto the surface on an object in accordance with an embodiment of the present invention.
Figure 17:
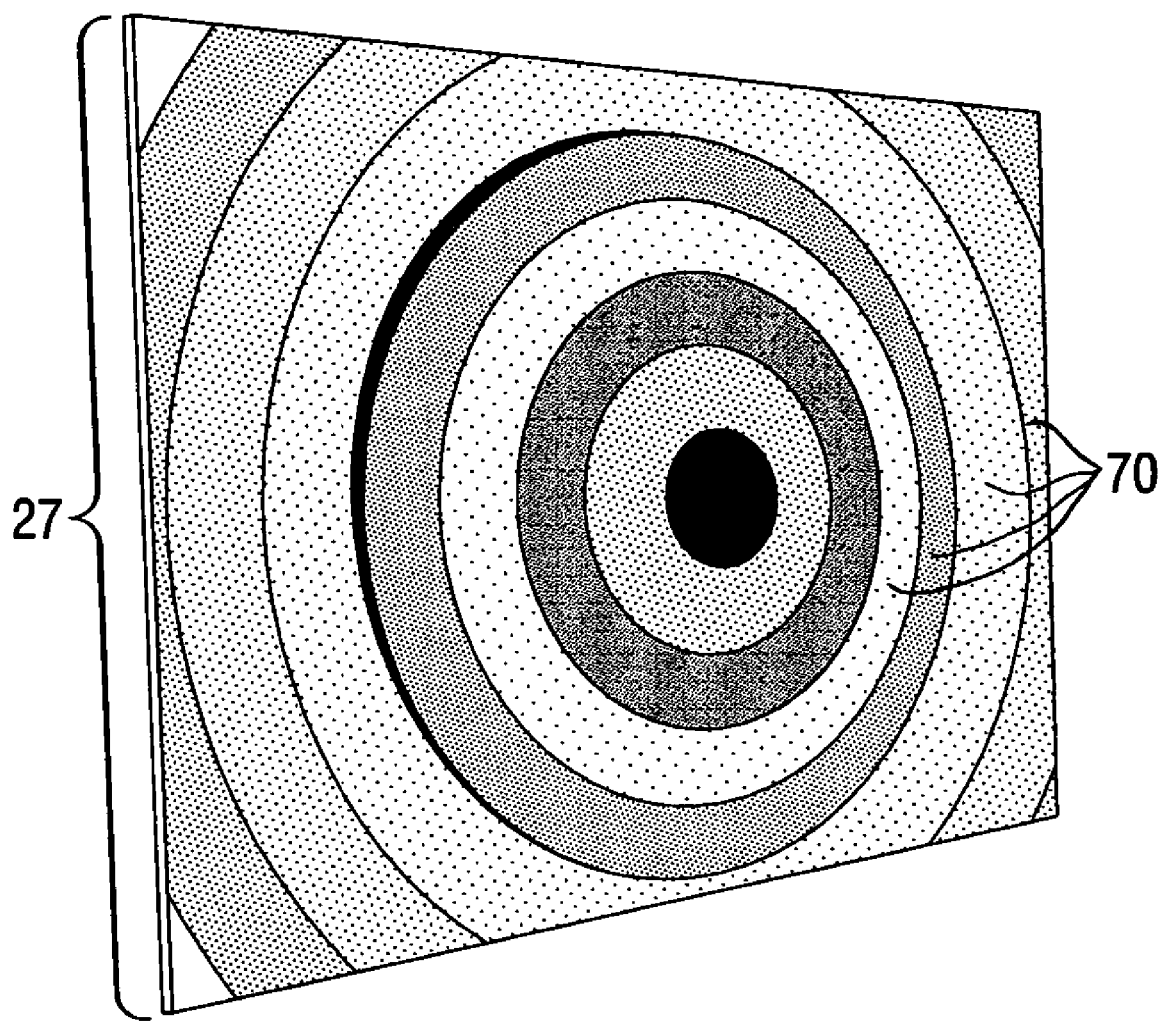
FIG. 17 is a schematic illustration of a plurality of concentric circle bands projected into the surface of an object in accordance with an embodiment of the present invention.

The first, second, third and fourth projections projected onto the surface 27 of the object 26 may comprise a plurality of regions of colored light. In one embodiment, the regions of colored light comprise generally parallel bands of electromagnetic radiation having differentiated wavelength. Parallel bands of differentiated wavelength are shown in FIG. 3 as bands 28, in FIG. 4 as bands 29, in FIG. 5 as bands 30 and in FIG. 6 as bands 31. In another embodiment, as shown in FIG. 17, the regions of colored light comprise concentric circles of electromagnetic radiation each having differentiated wavelength. In this embodiment, the bands of differentiated wavelength may be curved bands 70.

As used herein, the term "differentiated characteristic" means that each individual band has a wavelength, hue, saturation, perceived brightness or RGB value that is different from any band located immediately adjacent the individual band, and that the wavelength, hue, saturation, perceived brightness or RGB value of each individual band and the bands immediately adjacent the individual band are detectable by the image capture devices 21 as being distinct. The term "differentiated wavelength" means that each individual band has a wavelength that is different from any band located immediately adjacent the individual band, and that the wavelength of each individual band and the bands immediately adjacent the individual band are detectable by the image capture devices 21 as being distinct.

As used herein, the term "RGB value" means a composite value of red, green and blue electromagnetic radiation. In one embodiment, each individual band color has a specific RGB (red, green, blue) value. Red electromagnetic radiation, green electromagnetic radiation and blue electromagnetic radiation can be combined in various proportions to obtain any color in the visible spectrum. Each red, green and blue value can range from 0 to 100 percent of full intensity. Each color is represented by the range of decimal numbers from 0 to 255, producing 256 values for each color. In one embodiment, the RGB binary value is determined according to the table shown in FIG. 14. Each of the different colors: black, green, red, yellow, blue, cyan, magenta and white are color composites of red electromagnetic radiation, green electromagnetic radiation and blue electromagnetic radiation wherein the individual RGB components have values from 0 to 255. Accordingly, black is the absence of all RGB components, and white is the presence of equal amounts of all RGB components. Red has a red value of 255 with a green and blue value of 0. Likewise, blue has a blue value of 255 with a red and green value of 0, so too green has a green value of 255 with a red and blue value of 0. Yellow has a red value of 255 and a green value of 255 with a blue value of 0. Cyan has a green value of 255 and a blue value of 255 with a red value of 0. Finally, magenta has a red value of 255 and a blue value of 255 with a green value of 0. In another embodiment, each individual RGB value can be represented by the equivalent decimal, hexadecimal or binary number. For example, each individual RGB value may have a decimal value from 00000000 to 11111111. In this embodiment, red electromagnetic radiation would have a red value of 11111111, a blue value of 00000000 and a green value of 00000000. Each color will have an RGB value for red electromagnetic radiation, for blue electromagnetic radiation and for green electromagnetic radiation. A total of 16,777,216 possible RGB color values are possible.

In one embodiment each individual band comprises electromagnetic radiation having one of the following colors: black, green, red, yellow, blue, cyan, magenta or white. In another embodiment, the plurality of bands comprises individual bands, each having a color such that each adjacent band has a color having a large difference in intensity compared to the individual band. In another embodiment, the plurality of parallel bands are projected in the order: black, green, red, yellow, blue, cyan, magenta and white. This ordering, and other color orderings having a large difference in intensity, minimizes the bleed through of adjacent colors without necessitating the use of an opaque divider positioned between each band of color. In another embodiment, each individual band has a uniform appearance throughout the individual band. As used herein the term "uniform appearance" means that each individual band has a uniform hue and brightness throughout the band.

As shown in FIG. 3, a first projection can comprise a plurality of generally parallel wide bands of electromagnetic radiation 28 of differentiated wavelength projected onto a surface 27 of object 26. In one embodiment, the plurality of generally parallel wide bands are substantially vertical, however, the plurality of generally parallel wide bands 28 can be positioned at any an angle less than 90° from vertical. As used herein, the term "wide vertical bands" means a plurality of generally parallel wide bands of electromagnetic radiation of differentiated wavelength having a generally vertical direction, positioned at any angle less than 90° from vertical. In one embodiment, each individual wide vertical band 28 comprises a single different color and has uniform appearance throughout the band 28. Any number of wide vertical bands 28 can be projected onto a surface 27 of object 26. In one embodiment, from about 4 to about 27 wide vertical bands 28 may be projected onto the surface of object 26. In a particular embodiment, eight wide vertical bands 28 are projected onto the surface of object 26. The width of the wide vertical bands can vary according to the size and contours. In another embodiment, the width of each of the wide vertical bands 28 is substantially the same.

Figure 7:
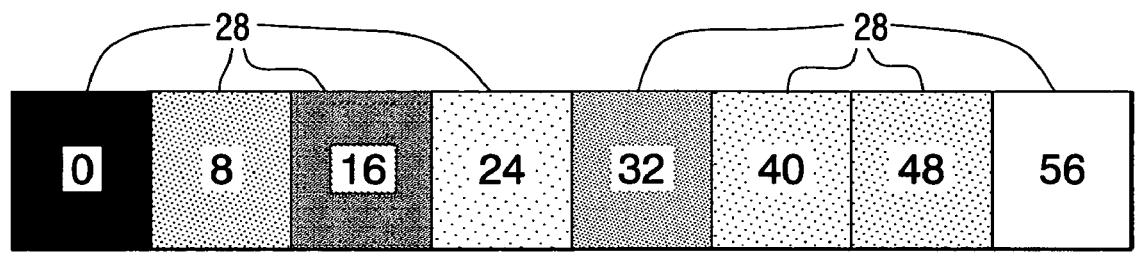
FIG. 7 is schematic illustration of a color-numeric identifier value chart for wide vertical bands in accordance with an embodiment of the present invention.

Once image capture devices 21 detect and/or record the projection of wide vertical bands 28, the information may be sent to a computer processor. As used herein, the term "computer processor" includes any device capable of receiving information from at least one image capture device 21 and numerically manipulating and/or formatting the information. As shown in FIG. 7, each of the wide vertical bands 28 can be assigned a color-numeric identifier based on the RGB value or wavelength of each of the wide vertical bands 28 in the first projection. As shown in FIG. 7, when eight wide vertical bands 28 are projected in the second projection, the color-numeric identifiers for each of the eight bands can be 0, 8, 16, 24, 32, 40, 48 and 56 respectively. However, it is herein contemplated that any non-repeating color-numeric values can be assigned to each of the wide vertical bands 28. In one embodiment, this information can be stored in a file contained on the computer processor.

Figure 4:
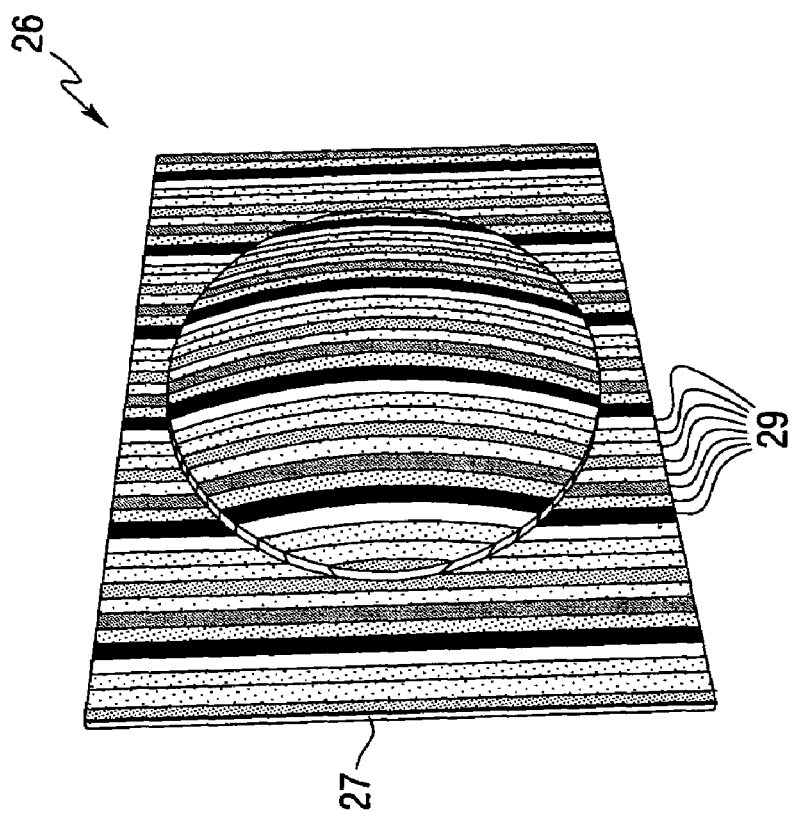
FIG. 4 is a schematic illustration of a plurality of thin vertical bands projected onto the surface of an object in accordance with an embodiment of the present invention.

As shown in FIG. 4, a second projection can comprise a plurality of generally parallel thin bands of electromagnetic radiation 29 of differentiated wavelength projected onto a surface 27 of object 26. In one embodiment, the thin bands 29 have about the same orientation as the wide bands 28 of the first projection. In another embodiment, the plurality of generally parallel thin bands are substantially vertical, however, the plurality of generally parallel thin bands can be positioned at any angle less than 90° from vertical. As used herein, the term "thin vertical bands" means a plurality of generally parallel thin bands of electromagnetic radiation of differentiated wavelength having a generally vertical direction, positioned at any angle less than 90° from vertical.

Any number of thin vertical bands 29 can be projected onto a surface of object 26 provided at least one thin vertical band 29 has a width that is less than the width of at least one wide vertical band 28 of the first projection. In another embodiment, the width of each of the thin vertical bands 29 is substantially the same. From about 16 to about 729 thin vertical bands 29 can be projected onto the surface of object 26. In another embodiment, the thin vertical bands 29 subdivide the area of object 26 previously illuminated with wide vertical bands 28. In a particular embodiment, sixty-four thin vertical bands 29 are projected onto the surface 27 of object 26, and subdivide the area of object 26 previously illuminated with 8 wide vertical bands 28. In another embodiment, the eight thin vertical bands 29 of the second projection occupy the same surface area as one wide vertical band 28 of the first projection. In yet another embodiment, the sixty-four thin vertical bands 29 of the second projection preferably equally subdivide the surface area occupied by eight wide vertical bands 28 of the first projection.

Figure 8:
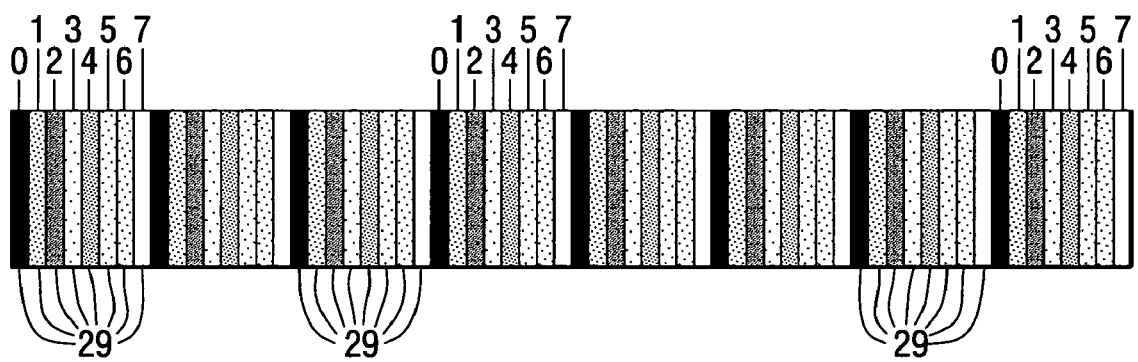
FIG. 8 is a schematic illustration of a color-numeric identifier value chart for thin vertical bands in accordance with an embodiment of the present invention.

Once the image capture devices 21 detect and/or record the projection of thin vertical bands 29, the information may be sent to the computer processor. As shown in FIG. 8, each of the thin vertical bands 28 can be assigned a color-numeric identifier based on the RGB value or wavelength of each of the thin vertical bands 29 in the second projection. This color-numeric value can be assigned to each thin vertical band 29 in the second projection. In one embodiment, when sixty-four thin vertical bands 29 are projected in the second projection, the color-numeric identifiers for each of the sixty-four bands can be a repeating pattern of 0, 1, 2, 3, 4, 5, 6, 7, 0, 1, 2, etc. respectively. However, it is herein contemplated that any repeating color-numeric values can be assigned to each of the thin vertical bands 29, provided the color-numeric values are non-repeating for the thin vertical bands 29 that subdivide the area occupied by a single wide vertical band in the first projection. In one embodiment, this information can be stored in a file contained on the computer processor.

Figure 11:
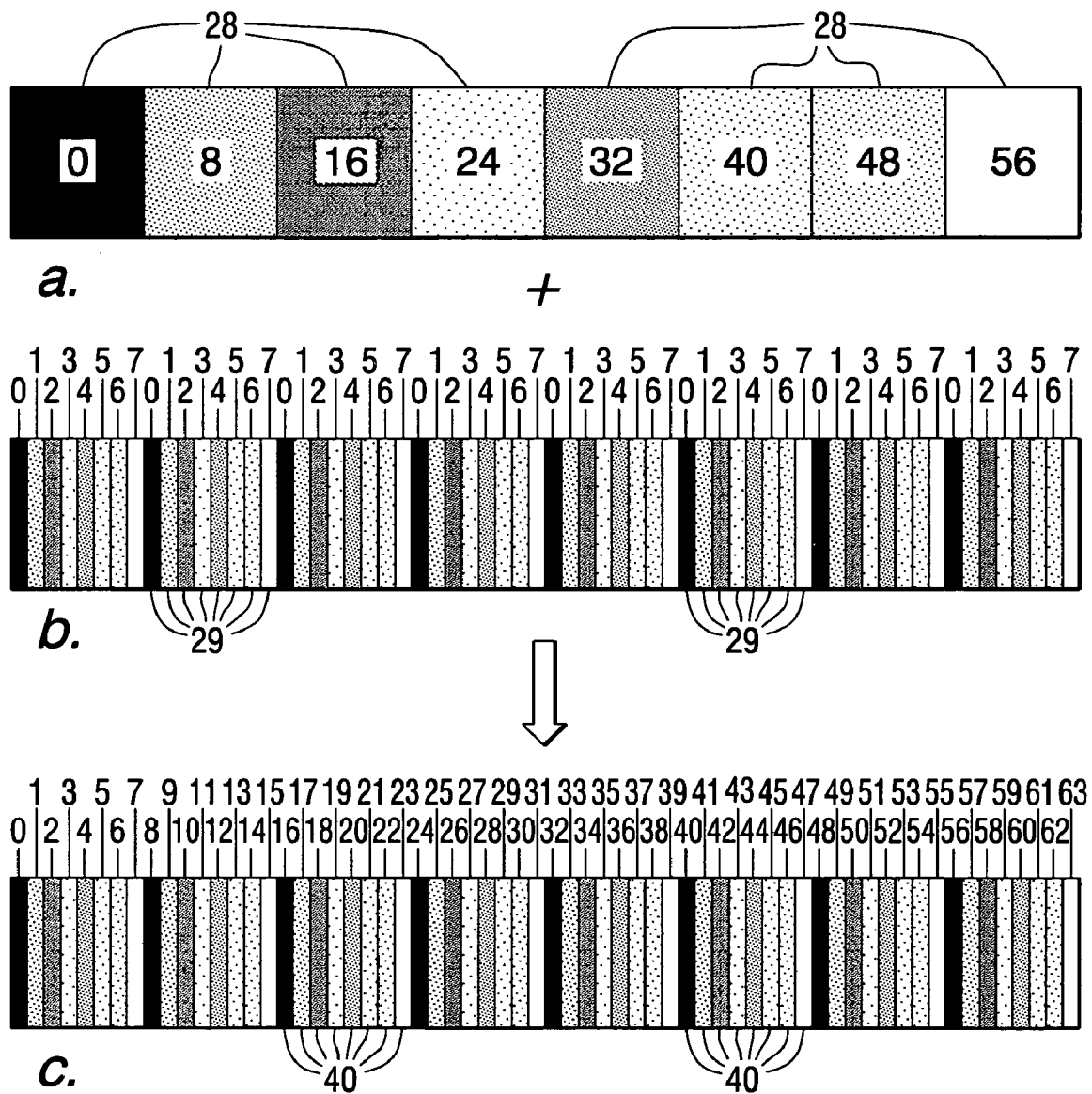
FIG. 11 is a schematic illustration of the vertical composite in accordance with an embodiment of the present invention.

As shown in FIG. 11, the stored color-numeric identifiers for both the wide vertical bands 28 and the thin vertical bands 29 can be combined by a function to produce a vertical final region value 40. The vertical final region value 40 is a function of the color-numeric value assigned to the wide vertical band 28 and the color-numeric value assigned to the thin vertical band 29 that occupy the same surface area in the first and second projections, respectively. In one embodiment, the final region value 40 for any specific location on the surface 27 of object 26 is the function of the color-numeric values assigned to the areas of the first and second projections that would overlap if both projections were projected at the same time. No two vertical final region values 40 will be identical for any given combination of wide vertical bands 28 and thin vertical bands 29. In one example, as shown in the FIG. 11, sixty-four vertical final region values 40 identifying sixty-four unique horizontal locations can be identified by performing a function on the color-numeric value assigned to the eight wide vertical bands 28 and the color-numeric value assigned to the sixty-four thin vertical bands 29. In one embodiment, adding the color-numeric value of the wide vertical bands 28 and the color-numeric value of the thin vertical bands 29 can produce the vertical final region value 40. As shown in FIG. 11, proceeding left to right along the color-numeric values and starting with the wide vertical band value shown in FIG. 11a and adding the color-numeric values of the thin vertical band value shown in FIG. 11b, the following vertical final region values 40 can be obtained: 0+0=0, 0+1=1,0+2=2, 0+3=3, 0+4=4, 0+5=5, 0+6=6, 0+7=7, 8+0=8, 8+1=9, 8+2=10, 8+3=11, 8+4=12, 8+5=13, 8+6=14, 8+7=15, 16+0=16, etc, as shown in FIG. 11c. An advantage to producing a vertical final region value 40 as a result of a function of the color-numeric value of the wide vertical bands 28 and the color-numeric value of the thin vertical bands 29, is that any horizontal location present in both projections can be numerically identified. The numeric identifier eliminates the need for a person to manually determine a location in the projections. In one embodiment, each unique vertical final region value 40 can be stored in a computer program.

Figure 6:
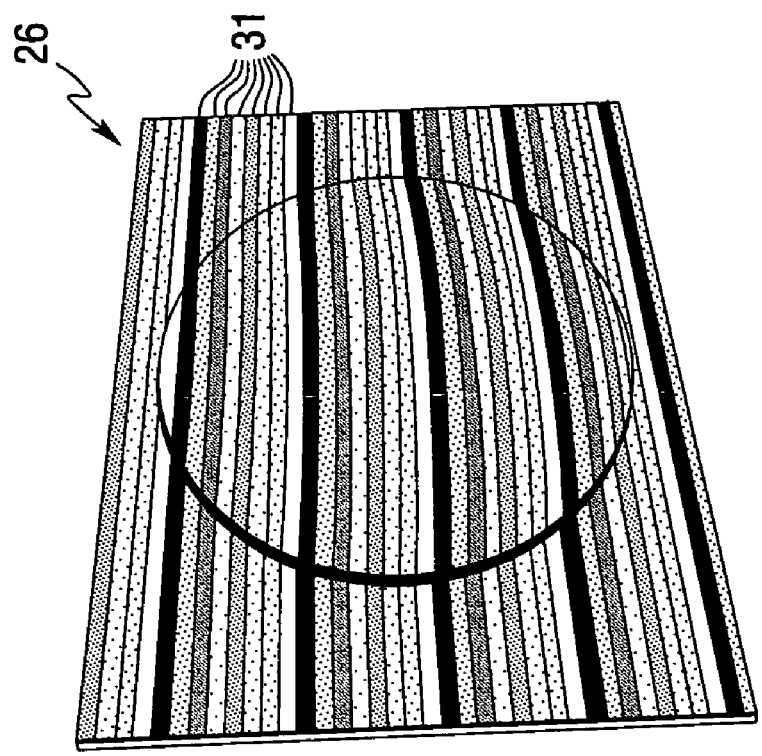
FIG. 6 is a schematic illustration of a plurality of thin horizontal bands projected onto the surface of an object in accordance with an embodiment of the present invention.
Figure 5:
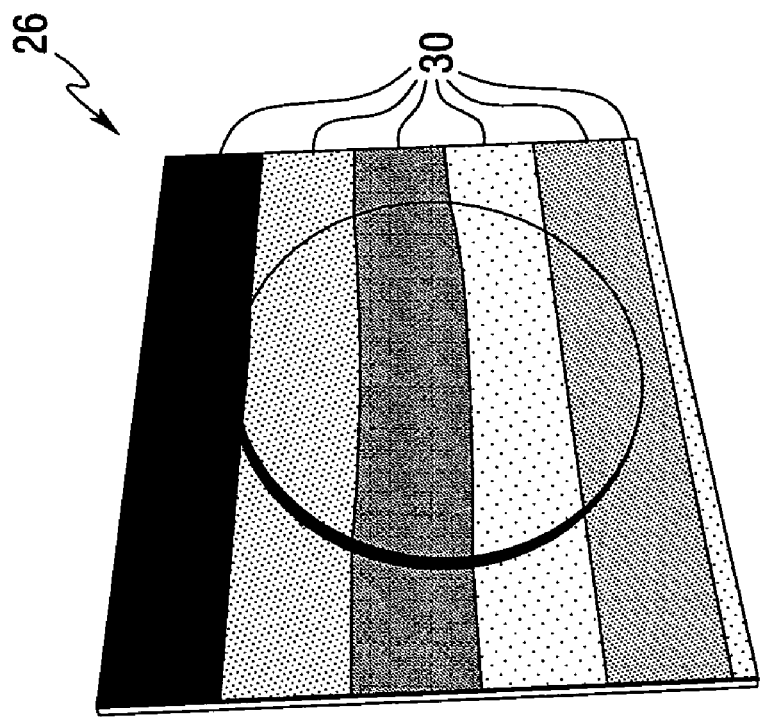
FIG. 5 is a schematic illustration of a plurality of wide horizontal bands projected onto the surface of an object in accordance with an embodiment of the present invention.
Figure 9:
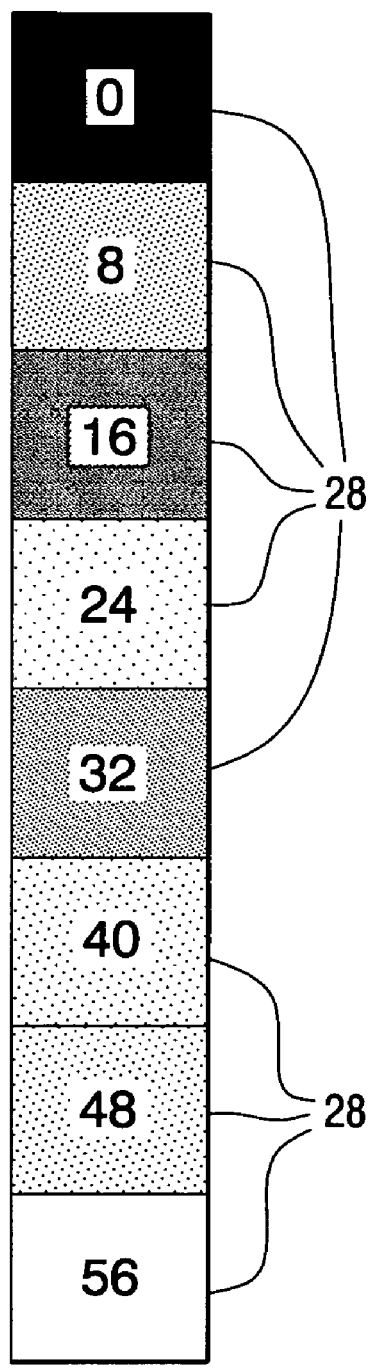
FIG. 9 is schematic illustration of a color-numeric identifier value chart for wide horizontal bands in accordance with an embodiment of the present invention.
Figure 10:
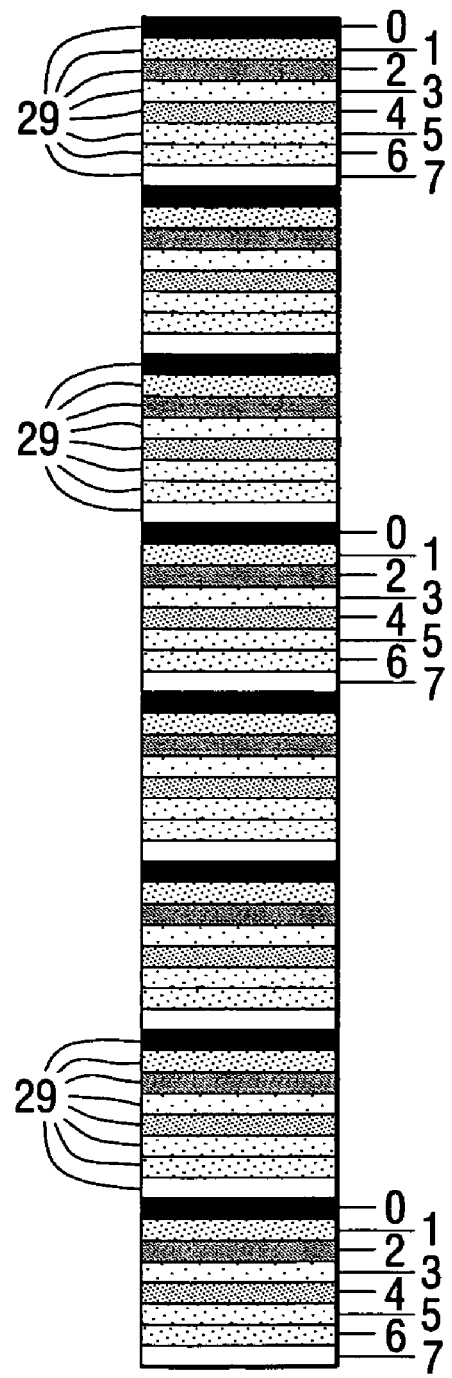
FIG. 10 is a schematic illustration of a color-numeric value identifier chart for thin horizontal bands in accordance with an embodiment of the present invention.

As shown in FIGS. 5 and 6, the same process described above is illustrated for wide horizontal bands 30 and thin horizontal bands 31 having an orientation that is generally perpendicular to the wide vertical bands 28 and thin vertical bands 29 shown in FIGS. 3 and 4. Accordingly, the additional steps of projecting a third projection having wide horizontal bands 30, detecting a third projection, assigning and optionally storing a color-numeric value, shown in FIG. 9, for each of the wide horizontal bands 30, are not recounted herein. However, these additional steps are understood to follow the same procedure identified above, with the understanding that the entire projected image is rotated about 90° with respect to the wide vertical bands 28 of the first projection. Likewise, the additional steps of projecting a fourth projection having thin horizontal bands 31, detecting a fourth projection, assigning and optionally storing a color-numeric value, shown in FIG. 10, for each of the thin horizontal bands 31, are not recounted herein. However, these additional steps are understood to follow the same procedure identified above, with the understanding that the thin horizontal bands 31 have an orientation that is substantially the same as the orientation of the wide horizontal bands 30.

Figure 12:
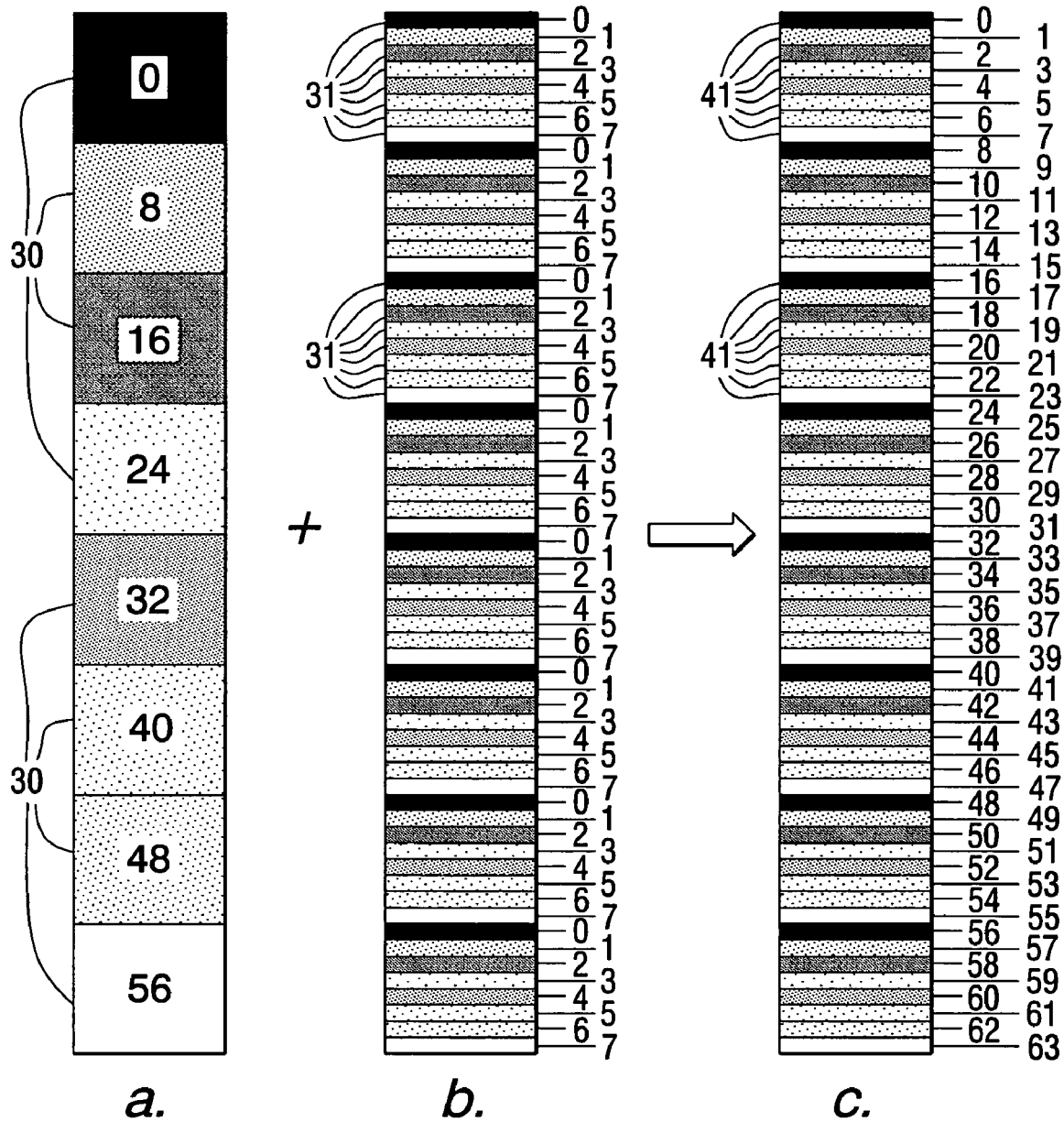
FIG. 12 is a schematic illustration of the horizontal composite in accordance with an embodiment of the present invention.

As shown in FIG. 12, the stored color-numeric identifiers for both the wide horizontal bands 30 and the thin horizontal bands 31 can be combined by a function to produce a horizontal final region value 31. The horizontal final region value 31 is a function of the color-numeric value assigned to the wide horizontal band 30 and the color-numeric value assigned to the thin vertical band 31 that occupy the same surface area in the third and fourth projections, respectively. In one embodiment, the final region value 31 for any specific location on the surface 27 of object 26 is the function of the color-numeric values assigned to the areas of the third and fourth projections that would overlap if both projections were projected at the same time. No two horizontal final region values 31 will be identical for any given combination of wide horizontal bands 30 and thin horizontal bands 31. In one example, as shown in FIG. 12, sixty-four horizontal final region values 31 identifying sixty-four unique vertical locations can be identified by performing a function on the color-numeric value assigned to the eight wide horizontal bands 30 and the color-numeric value assigned to the sixty-four thin horizontal bands 31. In one embodiment, adding the color-numeric value of the wide horizontal bands 30 and the color-numeric value of the thin horizontal bands 31 can produce the horizontal final region value 41. As shown in FIG. 12, proceeding top to bottom along the color-numeric values and starting with the wide horizontal band value shown in FIG. 12a and adding the color-numeric values of the thin horizontal band value shown in FIG. 12b, the following horizontal final region values 41 can be obtained: 0+0=0, 0+1=1, 0+2=2, 0+3=3, 0+4=4, 0+5=5, 0+6=6, 0+7=7, 8+0=8, 8+1=9, 8+2=10, 8+3=11, 8+4=12, 8+5=13, 8+6=14, 8+7=15, 16+0=16, etc as shown in FIG. 12c. An advantage to producing a horizontal final region value 41 as a result of a function of the wide horizontal bands 30 and the thin horizontal bands 31, is that any vertical location in the combined projections can be numerically identified. The numeric identifier eliminates the need for a person to manually determine a location in the projections. In one embodiment, each unique horizontal final region value 41 can be stored in a computer program.

The steps of determining vertical final region values 40 and horizontal final region values 41 can be performed sequentially or simultaneously. In one embodiment, as shown in FIG. 13, the vertical final region values 40 and the horizontal final region values 41 are combined to produce an overall final region value 50. The overall final region value 50 is a function of the vertical final region value 40, representing an x-coordinate, and the horizontal final region value 41, representing a y-coordinate. In one embodiment, the number of overall final region values 50 equals the product of the number of horizontal final region values 41 and the number of vertical final region values 40. In one embodiment, in which sixty-four vertical final region values 40 and sixty-four horizontal final region values 41 are determined, 4096 overall final region values 50 can be identified. These overall final region values 50 each identify a unique index and location and can include a specific (x,y) position, on the surface 27 of object 26. In one embodiment, the overall final region values 50 are each identified by a numeric representation. In another embodiment, this information is stored in a computer program. In yet another embodiment, the overall final region values 50 can be used with any triangulation method requiring the precise location of resins on the surface 27 of an object 26. The multiple images obtained by the image capture device 21 can be triangulated by reference to the unique overall final resin values 50.

Figure 15:
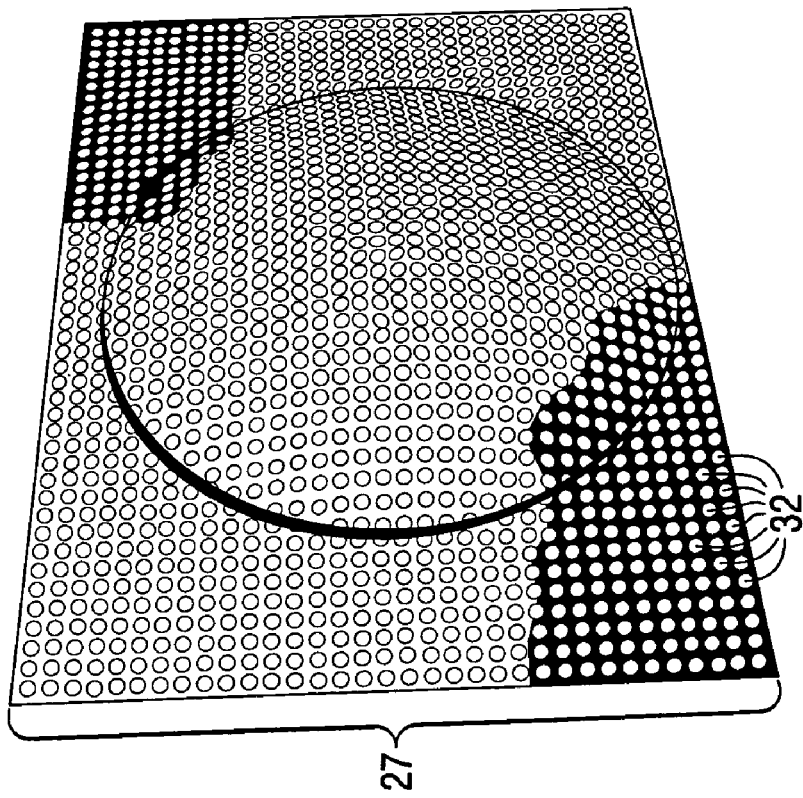
FIG. 15 is a schematic illustration of a white light dot pattern projected onto the surface of an object.

As shown in FIGS. 1. 2 and 15, a fifth projection can comprise a pattern of electromagnetic radiation that is projected onto a surface 27 of object 26. The pattern projection can comprise any uniform repeating pattern of targets 32 such as dots, squares, diamonds, x-shaped marks or checks. In one embodiment, the pattern projection comprises white visible light. In another embodiment, the pattern projection comprises a single color of visible light wherein every target 32 has substantially the same uniform appearance throughout the projection. FIG. 2 illustrates the projection of a single target 32 onto a surface of object 26. FIGS. 1 and 15 illustrate the projection of a plurality of targets 32 in a uniform distribution to form a pattern of electromagnetic radiation.

The density of the projected targets 32 depends on the change in surface contour of the object 26. A surface 27 of object 26 having a steep slope typically requires a denser array of targets 32 to accurately determine the surface contour than a surface area having a gradual slope. The density of the projected targets 32 is typically from about two thousand to about eight thousand targets per surface area of the object. The surface area of the object 26 can be less than a square inch to many square feet. In one embodiment, when 64 thin vertical bands 27 and 64 thin horizontal bands 28, about 4,096 targets are projected onto the surface of the object. Once the image capture devices 21 detect and/or record the uniform pattern of electromagnetic radiation, the projector 20 ceases projecting the fifth projection.

Figure 16:
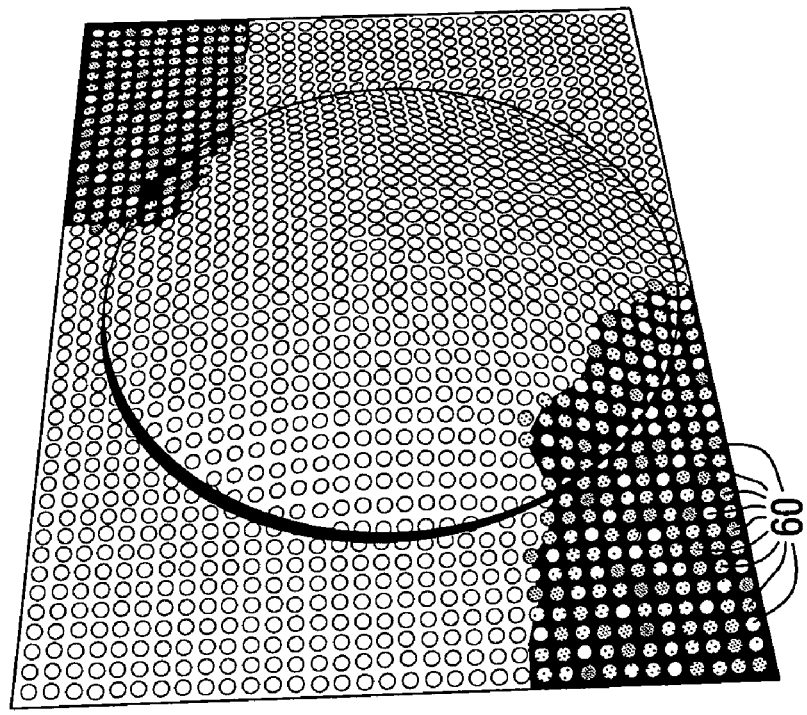
FIG. 16 is a schematic illustration of the colored targets having individual correlated region values in accordance with an embodiment of the present invention.

Once the final location values are determined, these values are correlated with the information data obtained from the uniform pattern of electromagnetic radiation projected in the fifth projection to produce a correlated region value 60. In one embodiment, the number of targets 32, wide vertical bands 28, thin vertical bands 29, wide horizontal bands 30 and thin horizontal bands 31 are selected such that each target 32 corresponds with exactly one overall final region value 50. As shown in FIG. 16, each target 32 projected in the pattern of electromagnetic radiation aligns perfectly with an overall final region value 50 to produce a correlated region value 60. Accordingly, each individual target 32 correlates to a unique overall final region value 50. In one embodiment, each individual target 32 is assigned the numeric representation that coincides with the specific surface area that both the overall final region value 50 and the target 32 share. In another embodiment, a center of mass algorithm can be used to find the center of the target 32. The color-numeric identifiers can be entered into a numeric array and processed to match up with the defined center of the target, which is then correlated with the final region value 50 to produce a correlated region value 60. The multiple images obtained by the image capture devices 21 can be triangulated to produce a three-dimensional image using any triangulation method requiring target identification known in the art.

The method and apparatus defined herein allow for easier assembly and shape testing of component parts. Objects 26 that are likely to benefit from system 10 and the processes outlined above include aircraft components, watercraft components, automotive components and semiconductor or integrated circuit boards. Aircraft components include, for example, fuselages, wings, skin panels, aircraft glass and other machined components used in the assembly of aircrafts. Aircraft include planes, jets, drones, helicopters, blimps, balloons and missiles and other devices capable of achieving at least some flight. Watercraft components include, for example, hulls, decks, bulkheads, double bottoms, side shells, fore and aft end structures and other machined components used in the assembly of watercrafts. Watercraft include ships, boats, barges, submarines and other devices capable of floating on or moving through an aqueous medium. Automotive components include hoods, fenders, body panels, door panels, truck beds, caps, trunk panels, automotive frames, floorboards, automotive glass, automotive sheet and other machined components used in the assembly of automotive vehicles. Automotive vehicles include all types and models of cars, trucks, sport utility vehicles, motorcycles, motorized scooters, armored transport vehicles and tanks.

Whereas particular embodiments of this invention have been described above for purposes of illustration, it will be evident to those skilled in the art that numerous variations of the details of the present invention may be made without departing from the invention as defined in the appended claims.

What is claimed is:

1. A method for determining the shape of a three-dimensional object, the method comprising:
   illuminating at least a portion of a surface of the object with electromagnetic radiation comprising a plurality of first bands of differentiated characteristics to form a first bands projection;
   detecting the first bands projection including the first bands of differentiated characteristics;
   illuminating at least a portion of the surface of the object with electromagnetic radiation comprising a plurality of second bands of differentiated characteristics to form a second bands projection, the second bands having a different orientation than the first bands;
   detecting the second bands projection including the second bands of differentiated characteristics;
   determining the shape of the object from the detected first bands projection and the detected second bands projection; and
   displaying the shape of the object on a screen, printing the shape of the object and/or storing the shape of the object on a computer.

2. The method of claim 1, wherein the differentiated characteristics of the first bands comprise differentiated wavelengths, and the differentiated characteristics of the second bands comprise differentiated wavelengths.

3. The method according to claim 1, wherein each of the plurality of first bands has a uniform appearance throughout each band.

4. The method according to claim 1, wherein each of the plurality of first bands are located immediately adjacent one another.

5. The method according to claim 1, wherein each of the plurality of first bands are generally parallel to one another.

6. The method according to claim 1, wherein each of the plurality of first bands are curved.

7. The method according to claim 1, wherein the plurality of first bands comprise concentric circles.

8. The method according to claim 1, wherein each of the plurality of second bands has a uniform appearance throughout each band.

9. The method according to claim 1, wherein each of the plurality of second bands are generally parallel to one another.

10. The method according to claim 1, wherein each of the plurality of second bands are located immediately adjacent one another.

11. The method according to claim 1, wherein the orientation of the plurality of first bands is about perpendicular to the orientation of the plurality of second bands.

12. The method according to claim 1, wherein one of the plurality of first bands and plurality of second bands are oriented in a substantially vertical direction and the other of the plurality of first bands and plurality of second bands are oriented in a substantially horizontal direction.

13. The method according to claim 1, wherein the number of first bands equals the number of second bands.

14. The method according to claim 1, wherein the plurality of first bands comprises at least four first bands.

15. The method according to claim 1, wherein the plurality of first bands comprises from 6 to 12 first bands.

16. The method according to claim 1, wherein each of the plurality of first bands comprise a different color of light.

17. The method according to claim 1, wherein each of the plurality of second bands comprise a different color of light.

18. The method according to claim 1, wherein detecting the first bands projection and detecting the second bands projection is accomplished by a camera, and the camera is movable to different positions in relation to the object.

19. The method according to claim 1, wherein a plurality of cameras detect the first bands projection and the second bands projection.

20. The method according to claim 1, further comprising the step of assigning a color-numeric identifier to each of the plurality of first bands and the plurality of second bands.

21. The method according to claim 20, wherein each of the color-numeric identifier is a unique number.

22. The method according to claim 20, further comprising the step of calculating a series of overall final region values, wherein each overall final region value is determined by a function of the color-numeric identifier of first band and the color-numeric identifier of a second band.

23. The method according to claim 22, further comprising:
 illuminating the same portion of the surface of the object with a pattern of electromagnetic radiation comprising discrete targets; and
 detecting the discrete targets.

24. The method according to claim 23, wherein die discrete targets comprise white light.

25. The method according to claim 23, wherein the discrete targets are generally round dots.

26. The method according to claim 23, further comprising correlating the discrete targets with the overall final region values to produce correlated region values.

27. The method according to claim 26, wherein correlating the discrete targets with the overall final region values is carried out by a computer program.

28. The method according to claim 26, wherein correlating the discrete targets with the final region values comprises triangulating the correlated region values to generate a three-dimensional model of a surface of the object.

29. The method according to claim 1, further comprising illuminating at least a portion of a surface of the object with electromagnetic radiation comprising a plurality of thin first bands of differentiated wavelength to form a thin first bands projection, the thin first bands having an orientation that is substantially the sane as the orientation of the first bands, and at least one of the thin first bands has a width that is less than the width of at least one of the first bands;
 detecting the thin first bands projection including the thin first bands of differentiated wavelength;
 illuminating at least a portion of the surface of the object with electromagnetic radiation comprising a plurality of thin second bands of differentiated wavelength to form a thin second bands projection, the thin second bands having an orientation that is substantially the same as the orientation of the second bands, and at least one of the thin second bands has a width that is less than the width of at least one of the second bands; and
 detecting the thin second bands projection including the thin second bands of differentiated wavelength.

30. The method according to claim 1, wherein said object comprises an aircraft component.

31. The method according to claim 1, wherein said object comprises a watercraft component.

32. The method according to claim 1, wherein said object comprises an automotive component.

33. A method for determining the shape of a three-dimensional object, the method comprising:
 illuminating at least a portion of a surface of the object with electromagnetic radiation comprising a plurality of wide bands of differentiated characteristics to form a wide bands projection;
 detecting the wide bands projection including the wide bands of differentiated characteristics;
 illuminating the same portion of the surface of the object with electromagnetic radiation comprising a plurality of thin bands of differentiated characteristics to form a thin bands projection, wherein the thin bands have an orientation that is substantially the same as the orientation of the wide bands, and at least one of the thin bands has a width that is less than the width of at least one of the wide bands;
 detecting the thin bands projection including the thin bands of differentiated characteristics;
 determining the shape of the object from the detected wide bands projection and the detected thin bands projection; and
 displaying the shape of the object on a screen, printing the shape of the object and/or storing the shape of the object on a computer.

34. The method of claim 33, wherein the differentiated characteristics of the first bands comprise differentiated wavelengths, and the differentiated characteristics of the second bands comprise differentiated wavelengths.

35. The method according to claim 33, wherein each of the wide bands have a uniform appearance.

36. The method according to claim 33, wherein each of the wide bands are located immediately adjacent one another.

37. The method according to claim 33, wherein each of the wide bands are generally parallel to one another.

38. The method according to claim 33, wherein each of the thin bands have a uniform appearance.

39. The method according to claim 33, wherein each of the thin bands are generally parallel to one another.

40. The method according to claim 33, wherein each of the thin bands are located immediately adjacent one another.

41. The method according to claim 33, wherein the thin bands projection can be superimposed on the wide bands projection.

42. The method according to claim 33, further comprising illuminating the same portion of a surface of the object with electromagnetic radiation comprising a plurality of additional wide bands of differentiated wavelength to form an additional wide band projection, wherein each of the additional wide bands has an orientation that is different from the orientation of the original wide bands;
 detecting the additional wide band projection including the additional wide bands of differentiated wavelength;
 illuminating the same portion of the surface of the object with electromagnetic radiation comprising a plurality of additional thin bands of differentiated wavelength to form an additional thin band projection, wherein the thin bands have an orientation that is generally the same as the orientation of the additional wide bands, and at least one additional thin band has a width that is less than the width of at least one additional wide bands; and
 detecting the additional thin band projection including the additional thin bands of differentiated wavelength.

43. The method according to claim 42, wherein the orientation of the plurality of wide bands is about perpendicular to the orientation of the plurality of additional wide bands.

44. The method according to claim 42, wherein one of the plurality of wide bands and the plurality of additional wide bands are oriented in a substantially vertical direction and the other of the plurality of wide bands and the plurality of additional wide bands are oriented in a substantially horizontal direction.

45. The method according to claim 42, wherein the number of wide bands equals the number of additional wide bands.

46. The method according to claim 42, wherein the plurality of wide bands comprises at least three wide bands.

47. The method according to claim 42, wherein the plurality of wide bands comprises from 6 to 12 wide bands.

48. The method according to claim 42, wherein each of the wide bands comprise a different color of light.

49. The method according to claim 42, wherein each of the plurality of additional wide bands comprise a different color of light.

50. The method according to claim 42, further comprising assigning a color-numeric value to each of the wide bands, thin bands, additional wide bands and additional thin bands.

51. The method according to claim 50, further comprising generating a first final region value from each of the color-numeric values for the wide bands and each of the color-numeric values for the thin bands, and generating a second final region value from each of the color-numeric values for the additional wide bands and each of the color-numeric values for the additional thin bands.

52. The method according to claim 51, further comprising generating an overall final region value from each of the first final region values and each of the second final region values.

53. The method according to claim 52, further comprising illuminating the same portion of the surface of the object with a pattern of electromagnetic radiation comprising discrete targets; and
    detecting the discrete target.

54. The method according to claim 53, wherein the electromagnetic radiation of the discrete targets comprises generally white visible light.

55. The method according to claim 53, further comprising correlating the discrete targets with the overall final region values to produce correlated region values.

56. The method according to claim 55, wherein said correlating the discrete targets with the final region values is carried out by a computer program.

57. The method according to claim 55, wherein correlating the discrete targets wit the final region values further comprises triangulating the correlated region values to generate a three-dimensional model of the surface portion of the object.

58. The method according to claim 33, wherein said object comprises an aircraft component.

59. The method according to claim 33, wherein said object comprises a watercraft component.

60. The method according to claim 33, wherein said object comprises an automotive component.

61. An apparatus for determining the shape of a three-dimensional object, comprising:
    illuminating means for illuminating at least a portion of a surface of the object with electromagnetic radiation comprising a plurality of first bands of differentiated characteristics to form a first bands projection;
    detecting means for detecting the first bands projection including the first bands of differentiated characteristics;
    second illuminating means for illuminating at least a portion of the surface of the object with electromagnetic radiation comprising a plurality of second bands of differentiated characteristics to form a second bands projection, the second bands having a different orientation than the first bands;
    second detecting means for detecting the second bands projection including the second bands of differentiated characteristics;
    shape determining means for determining the shape of the object from the detected first bands projection and the detected second bands projection; and
    means for displaying the shape of the object on a screen, printing the shape of the object and/or storing the shape of the object on a computer.

62. An apparatus for determining the shape of a three-dimensional object, comprising:
    illuminating means for illuminating at least a portion of a surface of the object with electromagnetic radiation comprising a plurality of wide bands of differentiated characteristics to form a wide bands projection;
    detecting means for detecting the wide bands projection including the wide bands of differentiated characteristics;
    second illuminating means for illuminating the same portion of the surface of to object with electromagnetic radiation comprising a plurality of thin bands of differentiated characteristics to form a thin bands projection, wherein the thin bands have an orientation that is substantially to same as the orientation of the wide bands, and at least one of the thin bands has a width that is less than the width of at least one of the wide bands;
    second detecting means for detecting to thin bands projection including the thin bands of differentiated characteristics;
    shape determining means for determining to shape of the object from the detected wide bands projection and to detected thin bands projection; and
    means for displaying the shape of the object on a screen, printing the shape of the object and/or storing the shape of the object on a computer.

* * * * *

UNITED STATES PATENT AND TRADEMARK OFFICE
CERTIFICATE OF CORRECTION

PATENT NO. : 7,154,613 B2  Page 1 of 1
APPLICATION NO. : 10/800499
DATED : December 26, 2006
INVENTOR(S) : Robert J. Christ, Jr. and John M. Papazian It is certified that error appears in the above-identified patent and that said Letters Patent is hereby corrected as shown below:

Claims

Column 13, Line 26 (Claim 24)
"wherein die" should read --wherein the--

Column 13, Line 45 (Claim 29)
"substantially the sane" should read --substantially the same--

Column 15, Line 37 (Claim 53)
"the discreet target." should read --the discreet targets.--

Column 15, Line 48 (Claim 57)
"targets wit" should read --targets with--

Column 16, Line 38 (Claim 62)
"surface of to object" should read --surface of the object--

Column 16, Line 42 (Claim 62)
"to same" should read --the same--

Column 16, Line 45 (Claim 62)
"to thin" should read --the thin--

Column 16, Line 48 (Claim 62)
"to shape" should read --the shape--

Column 16, Line 49 (Claim 62)
"and to" should read --and the--

Signed and Sealed this

Twenty-sixth Day of June, 2007

JON W. DUDAS
*Director of the United States Patent and Trademark Office*